(12) United States Patent
Poteet, III et al.

(10) Patent No.: US 11,461,361 B2
(45) Date of Patent: Oct. 4, 2022

(54) RAPID HYPERLEDGER ONBOARDING PLATFORM

(71) Applicant: CERNER INNOVATION, INC., Kansas City, KS (US)

(72) Inventors: James L. Poteet, III, Overland Park, KS (US); Vidya N V, Kerala (IN); Venkata Negeswara Rao Desaraju, Karnataka (IN); Roma Kumari, Jharkhand (IN); Pogaku Shahazad, Karnataka (IN)

(73) Assignee: CERNER INNOVATION, INC., North Kansas City, KS (US)

( * ) Notice: Subject to any disclaimer, the term of this patent is extended or adjusted under 35 U.S.C. 154(b) by 91 days.

(21) Appl. No.: 16/731,237

(22) Filed: Dec. 31, 2019

(65) Prior Publication Data
US 2021/0200785 A1 Jul. 1, 2021

(51) Int. Cl.
*G06F 16/27* (2019.01)

(52) U.S. Cl.
CPC .................................. *G06F 16/27* (2019.01)

(58) Field of Classification Search
CPC ....................................................... G07F 16/27
See application file for complete search history.

(56) References Cited

U.S. PATENT DOCUMENTS

| | | | |
|---|---|---|---|
| 6,343,271 B1 | 1/2002 | Peterson et al. | |
| 7,917,378 B2 | 3/2011 | Fitzgerald et al. | |
| 7,941,207 B2 | 5/2011 | Korzinov | |
| 8,615,403 B2 | 12/2013 | Lipsky et al. | |
| 8,756,073 B2 | 6/2014 | Hummer et al. | |
| 2003/0028482 A1 | 2/2003 | Burak et al. | |
| 2007/0073685 A1 | 3/2007 | Thibodeau et al. | |

(Continued)

FOREIGN PATENT DOCUMENTS

| | | |
|---|---|---|
| WO | 2015/175722 A1 | 11/2015 |
| WO | 2017/091777 A1 | 6/2017 |
| WO | 2017/223540 A1 | 12/2017 |

OTHER PUBLICATIONS

Preinterview First Office Action received for U.S. Appl. No. 15/830,319, dated Nov. 14, 2019, 6 pages.

(Continued)

*Primary Examiner* — Khanh B Pham
(74) *Attorney, Agent, or Firm* — Shook, Hardy & Bacon L.L.P.

(57) ABSTRACT

Systems and methods for providing a rapid hyperledger onboarding platform are provided. The rapid hyperledger onboarding platform enables various teams within an organization to have their own distributed ledger implementation with a private channel for communication among participants of that network. After a request is received from one or more clients to register an application with a distributed ledger comprising a peer node for each of the one or more clients, a selection of data elements to be stored in the distributed ledger is received. The application is instantiated on the distributed ledger. A separate channel is automatically created for each client of the one or more clients among the corresponding peer nodes. Each channel provides smart contract code execution for the application such that blocks are replicated to a node corresponding to a particular transaction and not to other peer nodes.

20 Claims, 15 Drawing Sheets

(56) References Cited

U.S. PATENT DOCUMENTS

| | | |
|---|---|---|
| 2011/0054925 A1 | 3/2011 | Ghani et al. |
| 2011/0246229 A1 | 10/2011 | Pacha |
| 2012/0239560 A1 | 9/2012 | Pourfallah et al. |
| 2014/0379361 A1 | 12/2014 | Mahadkar et al. |
| 2015/0332283 A1 | 11/2015 | Witchey |
| 2016/0110818 A1 | 4/2016 | Shemesh et al. |
| 2016/0342751 A1 | 11/2016 | Alstad et al. |
| 2017/0161439 A1 | 6/2017 | Raduchel et al. |
| 2018/0375840 A1* | 12/2018 | Moy ........................ G06F 16/27 |
| 2019/0102409 A1* | 4/2019 | Shi ....................... H04L 67/1097 |
| 2019/0172107 A1 | 6/2019 | Poteet, III et al. |
| 2019/0172561 A1 | 6/2019 | Poteet, III et al. |
| 2019/0172562 A1 | 6/2019 | Poteet, III et al. |
| 2019/0172563 A1 | 6/2019 | Poteet, III et al. |
| 2019/0340013 A1 | 11/2019 | Cella |
| 2019/0384927 A1* | 12/2019 | Bhatnagar ............. H04L 9/0637 |
| 2020/0204345 A1* | 6/2020 | Chee ..................... H04L 9/3247 |
| 2020/0204557 A1* | 6/2020 | Singh ..................... H04L 9/0637 |
| 2020/0211409 A1 | 7/2020 | Latorre et al. |
| 2020/0342455 A1 | 10/2020 | Poteet et al. |
| 2021/0097602 A1 | 4/2021 | Eichel et al. |

OTHER PUBLICATIONS

Preinterview First Office Action received for U.S. Appl. No. 15/830,336, dated Dec. 23, 2019, 7 pages.
Preinterview First Office Action received for U.S. Appl. No. 16/457,320, dated May 17, 2021, 4 pages.
Non-Final Office Action received for U.S. Appl. No. 15/830,258, dated Dec. 7, 2021, 43 pages.
Final Office Action received for U.S. Appl. No. 16/457,320, dated Feb. 22, 2022, 18 pages.

* cited by examiner

```
sample json
{
  "id": "file",
  "value": "File",
  "popup": {
    "menuitem": [
      {"value": "New", "onclick": "CreateNewDoc()"},
      {"value": "Open", "onclick": "OpenDoc()"},
      {"value": "Close", "onclick": "CloseDoc()"}
    ]
  }
}
```

FIG. 8.

| Databases | | |
|---|---|---|
| Name | Size | # of Docs |
| _global_changes | 2.5 KB | 9 |
| _replicator | 2.3 KB | 1 |
| _users | 2.1 KB | 1 |
| mychannel_ | 4.6 KB | 2 |
| mychannel_correspondence_statements | 488 bytes | 1 |
| mychannel_lscc | 0.6 KB | 1 |

```
mychannel_correspondence_statements > DATA61294846166145821

Save Changes | Cancel 1
 2   "_id": "DATA61294846166145821",
 3   "_rev": "1-269747f275b2e355e01944b2e9226e6e",
 4   "associateID": "cerner",
 5   "contextName": "correspondence_statements",
 6   "departmentName": "HDXTS",
 7   "keys": [
 8     "id"
 9     "popup"
10   ],
11   "password": "cerner",
12   "~version": "2.0"
13 }
```

RAPID HYPERLEDGER ONBOARDING PLATFORM

BACKGROUND

Although blockchain technology is still in its infancy stage, its potential to change the business, energy, health care, financial, and government sectors, among others, is boundless. Blockchain technology enables people or businesses to conduct transactions directly, without the need of a trusted third party or middleman. It is fast, secure, and objective and its transactions are immutable and irreversible.

In its simplest form, a blockchain is an electronic ledger that is distributed and decentralized across many distinct nodes and allows verifiable and permanent transactions between parties. Potential use cases to improve various technologies have become a common discussion among nearly every industry.

However, even after an applicable use case has been identified, implementing blockchain technology introduces a number of challenges. For example, identifying a suitable blockchain application may be difficult and many of the available blockchain applications are costly. Further, many organizations simply lack internal knowledge necessary to develop a strategy around blockchain technology and transitioning from legacy structures may be overwhelming and require third-party assistance. Moreover, even when one team within an organization has implemented a blockchain, a significant effort is still required for other teams within the organization to ramp up to speed on blockchain technology and implement the same.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure relate to systems and methods for providing a rapid hyperledger onboarding platform. More particularly, embodiments of the present disclosure enable various teams within an organization to have their own blockchain implementation with a private channel for communication among participants of that network. To do so, a request is received from one or more clients to register an application with a distributed ledger comprising a peer node for each of the one or more clients. A selection of data elements to be stored in the distributed ledger is received from each client of the one or more clients. The application is instantiated on the distributed ledger. A separate channel is automatically created for each client of the one or more clients between the corresponding peer nodes intended for each respective client. Each channel provides chaincode (to perform, create, read, update, and delete operations for data stored in the Blockchain) execution such that blocks are replicated across the participating peer nodes for a particular client.

BRIEF DESCRIPTION OF THE SEVERAL VIEWS OF THE DRAWINGS

The present invention is described in detail below with reference to the attached drawing figures, wherein:

FIGS. 6-14 depicts illustrative screen displays of a rapid hyperledger onboarding platform, in accordance with embodiments of the present invention.

DETAILED DESCRIPTION

Figure 1:
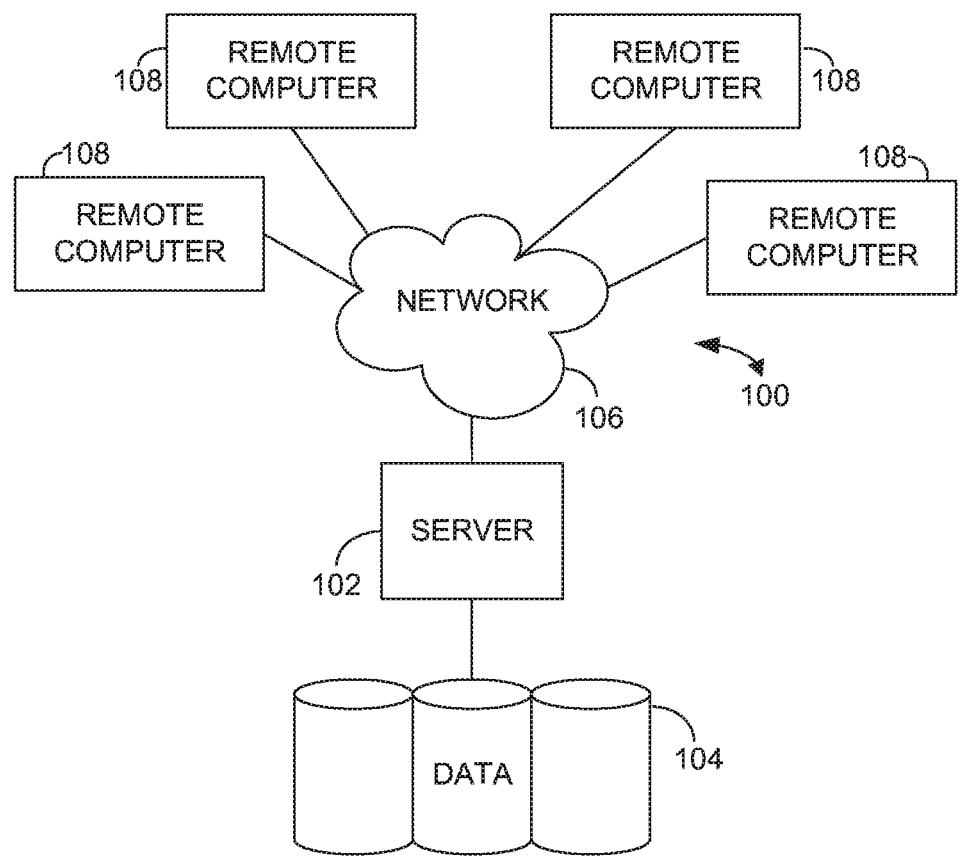
FIG. 1 is a block diagram of an exemplary operating environment suitable to implement embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

As noted in the background, although blockchain technology is still in its infancy stage, its potential to change the business, energy, health care, financial, and government sectors, among others, is boundless. Blockchain technology enables people or businesses to conduct transactions directly, without the need of a trusted third party or middleman. It is fast, secure, and objective and its transactions are immutable and irreversible.

In its simplest form, a blockchain is an electronic ledger that is distributed and decentralized across many distinct nodes and allows verifiable and permanent transactions between parties. Potential use cases to improve various technologies have become a common discussion among nearly every industry.

However, even after an applicable use case has been identified, implementing blockchain technology introduces a number of challenges. For example, identifying a suitable blockchain application may be difficult and many of the available blockchain applications are costly. Further, many organizations simply lack internal knowledge necessary to develop a strategy around blockchain technology and transitioning from legacy structures may be overwhelming and require third-party assistance. Moreover, even when one team within an organization has implemented blockchain, a significant effort is still required for other teams within the organization to ramp up to speed on blockchain technology and implement the same.

Embodiments of the present disclosure relate to systems and methods for providing a rapid hyperledger onboarding platform. More particularly, embodiments of the present disclosure enable various teams within an organization to have their own blockchain implementation with a private channel for communication among participants of that network. To do so, a request is received from one or more clients to register an application with a distributed ledger comprising a peer node for each of the one or more clients. A selection of data elements to be stored in the distributed ledger is received from each client of the one or more clients. The application is instantiated on the distributed ledger. A separate channel is automatically created for each client of the one or more clients among the participating peer nodes. Each channel provides smart contract code execution for the application such that blocks are replicated to a node corresponding to a particular transaction and not replicated to other non-participating peer nodes for a particular channel.

In embodiments, the rapid hyperledger onboarding platform provides the benefits of using the blockchain to every organization or a particular team within an organization without undergoing a massive learning and deployment curve. This minimizes efforts and time for each organization or team for setup, experimentation, and deployment of blockchain using distributed ledger software (e.g., Hyperledger Fabric).

In embodiments, the rapid hyperledger onboarding platform enables various teams within an organization to have their own blockchain implementation with a private channel for communication among participants of that network. The rapid hyperledger onboarding platform provides the capability to leverage a blockchain implementation without having to invest any efforts and time towards setup and experimentation. Once the team registers using the rapid hyperledger onboarding platform, an instance of the team's blockchain spins up with the specifications (or fields) of data the team wants to store. This reduces the cumbersome effort to set up everything (e.g., DOCKER containers, Node SDK, fabric network, certificates, etc.) from scratch.

The default chaincode implementation of the rapid hyperledger onboarding platform for each team in the organization is create, read, update, and delete (CRUD) operations. This increases the transparency between the team and client and maintenance of the ledger (i.e., the e-file of the transactions conducted in the network) becomes effortless. The clients/users can focus on their own business logic rather than be concerned about the management and maintenance of the data stored. The complete process of data management on operations on the data will be handled by the rapid hyperledger onboarding platform. When a user registers with the rapid hyperledger onboarding platform, a new private channel is created internally and dynamically with the name of the corresponding context (specific project within a team for which the blockchain implementation is to be used) that was used while registering the client. Also, a genesis block (i.e., the first block) is added in the blockchain with the details of the fields that were chosen to be stored in the future. These are used as a reference to insert data the next time a block is added to the chain. The interface can be used for searching inserted data.

Because the rapid hyperledger onboarding platform removes learning of the technology stack, the intricacies and the pitfalls of implementing blockchain are avoided. Utilizing the rapid hyperledger onboarding platform facilitates faster adoption, no learning curve, and hassle free management of the blockchain network and still reaps the benefits of using this niche technology. Any team with a blockchain use case is quickly and efficiently able to onboard on to the blockchain platform. This helps the teams and organizations focus on innovations rather than data handling.

Accordingly, one embodiment of the present disclosure is directed to a system. The system includes a processor; and a computer storage medium storing computer-usable instructions that, when used by the processor, cause the processor to: receive a request from one or more clients to register an application with a distributed ledger for a selected concept, the distributed ledger comprising a peer node for each of the one or more clients; receive, from each client of the one or more clients, a selection of data elements to be stored in the distributed ledger; and instantiate the application on the distributed ledger for the selected concept, wherein a separate channel is automatically created for each client of the one or more clients between participating peer nodes, each channel providing smart contract code execution for the application such that blocks are replicated to a node corresponding to a particular transaction for a client of the one or more clients and not replicated to other peer nodes that are not associated with the blockchain network for a particular client.

In another embodiment, the present disclosure directed to a computerized method for utilizing frictionless processing to bypass insurance verification billing. The method includes receiving a request from one or more clients to register an application with a distributed ledger comprising a peer node for each of the one or more clients. The method also includes receiving, from each client of the one or more clients, a selection of data elements to be stored in the distributed ledger. The method further includes instantiating the application on the distributed ledger. A separate channel is automatically created for each client of the one or more clients among the participating peer nodes. Each channel provides smart contract code execution for the application such that blocks are replicated to the nodes corresponding to a particular transaction and not replicated to other peer nodes.

In yet another embodiment, the present disclosure is directed to one or more computer storage media having computer-executable instructions embodied thereon that, when executed by a computer, causes the computer to perform operations. The operations include receiving a request from one or more clients to register an application with a distributed ledger comprising a peer node for each of the one or more clients. The operations also include receiving, from each client of the one or more clients, a selection of data elements to be stored in the distributed ledger. The operations further include instantiating the application on the distributed ledger. A separate channel is automatically created for each client of the one or more clients among the participating peer nodes. Each channel provides smart contract code execution for the application such that blocks are replicated to a node corresponding to a particular transaction and not replicated to other peer nodes.

Having briefly described embodiments of the present invention, an exemplary operating environment suitable for use in implementing embodiments of the present invention is described below. FIG. 1 provides an aspect of an example operating environment with which embodiments of the present invention may be implemented. The aspect of an operating environment is illustrated and designated generally as reference numeral 100.

Example operating environment 100 comprises a general purpose computing device in the form of a control server 102. Exemplary components of the control server 102 comprise a processing unit, internal system memory, and a suitable system bus for coupling various system components, including database cluster 104, with the control server 102. The system bus might be any of several types of bus structures, including a memory bus or memory controller, a peripheral bus, and a local bus, using any of a variety of bus architectures. Exemplary architectures comprise Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

Control server 102 typically includes therein, or has access to, a variety of computer-readable media, for instance, database cluster 104. Computer-readable media can be any available media that might be accessed by control server 102, and includes volatile and nonvolatile media, as well as, removable and nonremovable media. Computer-readable media might include computer storage media. Computer storage media includes volatile and nonvolatile media, as well as removable and nonremovable media implemented in any method or technology for storage of information, such as computer-readable instructions, data structures, program modules, or other data. In this regard, computer storage media might comprise RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the control server 102. Computer storage media does not comprise signals per se. Combinations of any of the above also may be included within the scope of computer-readable media.

The computer storage media discussed above and illustrated in FIG. 1, including database cluster 104, provide storage of computer-readable instructions, data structures, program modules, and other data for the control server 102. In some embodiments, data cluster 104 takes the form of a cloud-based data store, and in some embodiments is accessible by a cloud-based computing platform.

The control server 102 might operate in a computer network 106 using logical connections to one or more remote computers 108. Remote computers 108 might be located at a variety of locations in a medical or research environment, including clinical laboratories (e.g., molecular diagnostic laboratories), hospitals and other inpatient settings, veterinary environments, ambulatory settings, medical billing and financial offices, hospital administration settings, home healthcare environments, and providers' offices. Providers may comprise a treating physician or physicians; specialists such as surgeons, radiologists, cardiologists, and oncologists; emergency medical technicians; physicians' assistants; nurse practitioners; nurses; nurses' aides; pharmacists; dieticians; microbiologists; laboratory experts; laboratory technologists; genetic counselors; researchers; veterinarians; students; and the like.

The remote computers 108 might also be physically located in nontraditional medical care environments so that the entire healthcare community might be capable of integration on the network. The remote computers 108 might be personal computers, servers, routers, network PCs, peer devices, other common network nodes, or the like and might comprise some or all of the elements described above in relation to the control server 102. The devices can be personal digital assistants or other like devices.

In some embodiments, remote computers 108 comprise computing-devices that are part of a cloud-computing platform. For example, the control server 102 might operate in a computer network 106 hosted as part of a cloud service (e.g., AMAZON WEB SERVICES, GOOGLE HOSTING, IBM BLUEMIX). In some embodiments, a remote computer 108 is associated with a health records data source such as an electronic health record (EHR) system of a hospital or medical organization, a health information exchange EHR, insurance provider EHR, ambulatory clinic EHR, or patient-sensor, or other data source, and facilitates accessing data of the source and communicating the data to control server 102 and/or other computing devices on a cloud computing platform, including other remote computers 108.

Exemplary computer networks 106 comprise local area networks (LANs) and/or wide area networks (WANs). Such networking environments are commonplace in offices, enterprise-wide computer networks, intranets, and the Internet. When utilized in a WAN networking environment, the control server 102 might comprise a modem or other means for establishing communications over the WAN, such as the Internet. In a networked environment, program modules or portions thereof might be stored in association with the control server 102, the database cluster 104, or any of the remote computers 108. For example, various application programs may reside on the memory associated with any one or more of the remote computers 108. It will be appreciated by those of ordinary skill in the art that the network connections shown are exemplary and other means of establishing a communications link between the computers (e.g., control server 102 and remote computers 108) might be utilized.

In operation, an organization might enter commands and information into the control server 102 or convey the commands and information to the control server 102 via one or more of the remote computers 108 through input devices, such as a keyboard, a pointing device (commonly referred to as a mouse), a trackball, or a touch pad. Other input devices comprise microphones, satellite dishes, scanners, or the like. Commands and information might also be sent directly from a remote healthcare device to the control server 102. In addition to a monitor, the control server 102 and/or remote computers 108 might comprise other peripheral output devices, such as speakers and a printer.

In some embodiments, control server 102 is a computing system or platform made up of one or more computing devices. Embodiments of control server 102 may be a distributed computing system, a centralized computing system, a single computer such as a desktop or laptop computer or a networked computing system. Thus, in some embodiments, control server 102 comprises a multi-agent computer system with software agents.

Figure 2:
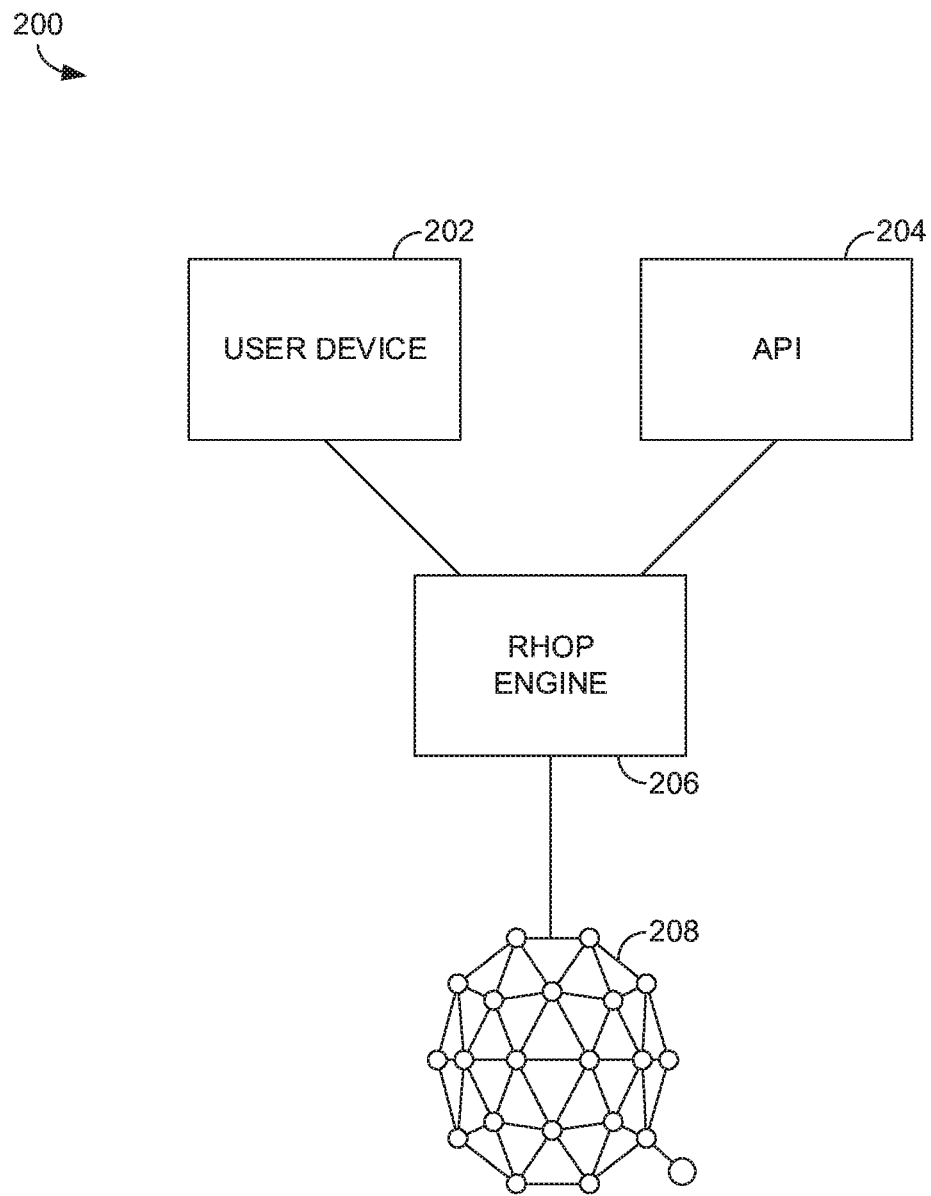
FIG. 2 depicts an exemplary framework of a rapid hyperledger onboarding platform suitable to implement embodiments of the present disclosure.

Turning now to FIG. 2, an exemplary framework of a rapid hyperledger onboarding platform 200 is shown, in accordance with an aspect of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory. The rapid hyperledger onboarding platform 200 may be implemented via any type of computing device, such as computing device 100 described above with reference to FIG. 1, for example.

The rapid hyperledger onboarding platform 200 generally operates to provide the benefits of using a blockchain or distributed ledger to every organization or a particular team within an organization without undergoing a massive learning and deployment curve. This minimizes efforts and time for each organization or team for setup, experimentation, and deployment of the blockchain using distributed ledger software. Because the rapid hyperledger onboarding platform removes learning of the technology stack, the intricacies and the pitfalls of implementing a blockchain are avoided. Accordingly, faster adoption, no learning curve, and hassle free management of the blockchain network are realized and the benefits of using this niche technology may still be reaped. Thus, any team with a blockchain use case is quickly and efficiently able to onboard on to the blockchain platform.

As shown in FIG. 2, the rapid hyperledger onboarding platform 200 includes, among other components not shown, a user device 202, an application programming interface (API) 204, a rapid hyperledger onboarding platform (RHOP) engine 206, and a distributed ledger 208. It should be understood that the rapid hyperledger onboarding platform 200 shown in FIG. 2 is an example of one suitable computing system architecture. Each of the components shown in FIG. 2 may be implemented via any type of computing device, such as computing device 100 described with reference to FIG. 1, for example.

The components may communicate with each other via a network, which may include, without limitation, one or more local area networks (LANs) and/or wide area networks (WANs). Such networking environments are commonplace in offices, enterprise-wide computer networks, intranets, and the Internet. It should be understood that any number of patient accounting components, analytics components, financial hubs, or payer/partner systems may be employed within the rapid hyperledger onboarding system 200 within the scope of the present disclosure. Each may comprise a single device or multiple devices cooperating in a distributed environment. For instance, the application programming interface (API) 204, the rapid hyperledger onboarding (RHOP) engine 206, or the distributed ledger 208 may be provided via multiple devices arranged in a distributed environment that collectively provide the functionality described herein. In other embodiments, a single device may provide the functionality of multiple components of the rapid hyperledger onboarding platform 200. For example, a single device may provide the API 204 and the RHOP engine 206. Additionally, other components not shown may also be included within the network environment.

Generally, with reference to FIG. 2, a user device 202 hosting a user interface enables a user to initiate a request to create or query a blockchain. For clarity, the user device 202 may be any type of commuting device used to receive, display, and send information. User device 202 may be capable of communicating via the network with the RHOP engine 206 or the distributed ledger 208. Such device may include any type of mobile and portable device including cellular telephones, personal digital assistants, tablet PCs, smart phones, and the like.

A client may initiate requests at the user device 202 via a user interface. The user interface enables a client to register an application with the distributed ledger 208. The process of registration involves installing and instantiating the chaincode (smart contract for CRUD operations) for a particular context. Context can be thought of as a specific application of the client that wants to use RHOP to leverage Blockchain features. After the application is registered, the user interface provides instructions to the RHOP engine 206 to decide which data elements should be stored in a blockchain of the distributed ledger 208 in the future. This block with the information of the fields to be stored in future gets added as the genesis block in the Blockchain. This becomes the reference for future insertions of data. Additionally, the user interface enables a client to search a blockchain of the distributed ledger for a particular transaction.

The API 204 generally operates to enable various applications to access the RHOP engine 206. In this way, the API 204 helps in bypassing the user interface. The set of APIs enable clients to directly interact with the RHOP engine through REST calls without having to register/insert/query through the user interface. The API 204 also enables a series of authentication and authorization activities that happen at the chaincode level which permits (or denies) the application to add a new block to the chain.

The RHOP engine 206 provides a REST endpoint at the API 204 that is exposed with the appropriate headers with appropriate headers like context and service account identification. Context can be thought of as a specific application of the client that wants to use RHOP to leverage Blockchain features. Context can be helpful to tie a set of fields to a specific application. If the same client wants to register a different application with a different set of fields to store in Blockchain using RHOP engine, context may be the unique parameter differentiating the two applications. In this way, context can thought of as an equivalent of the application name. The REST endpoint enables CRUD operations to be performed on the blockchain with HTTP requests made by the applications that have been registered with the distributed ledger 208. A series of authentication and authorization activities happen at the chaincode level which then permits (or denies) the application to add a new block to the chain.

The distributed ledger 208 generally creates a blockchain for each registered application. For clarity, for each concept of a registering application, a separate blockchain is created. Once authentication and authorization passes from the REST endpoint level, a new block is added to the chain. The distributed ledger 208 also provides results from queries made to a blockchain from a user via a user interface of the user device 202. In this implementation, the complexities of the implementing a blockchain (e.g., consensus, orderers, endorsers, certificate authority, peers, etc.) are isolated and abstracted from the end users.

Figure 3:
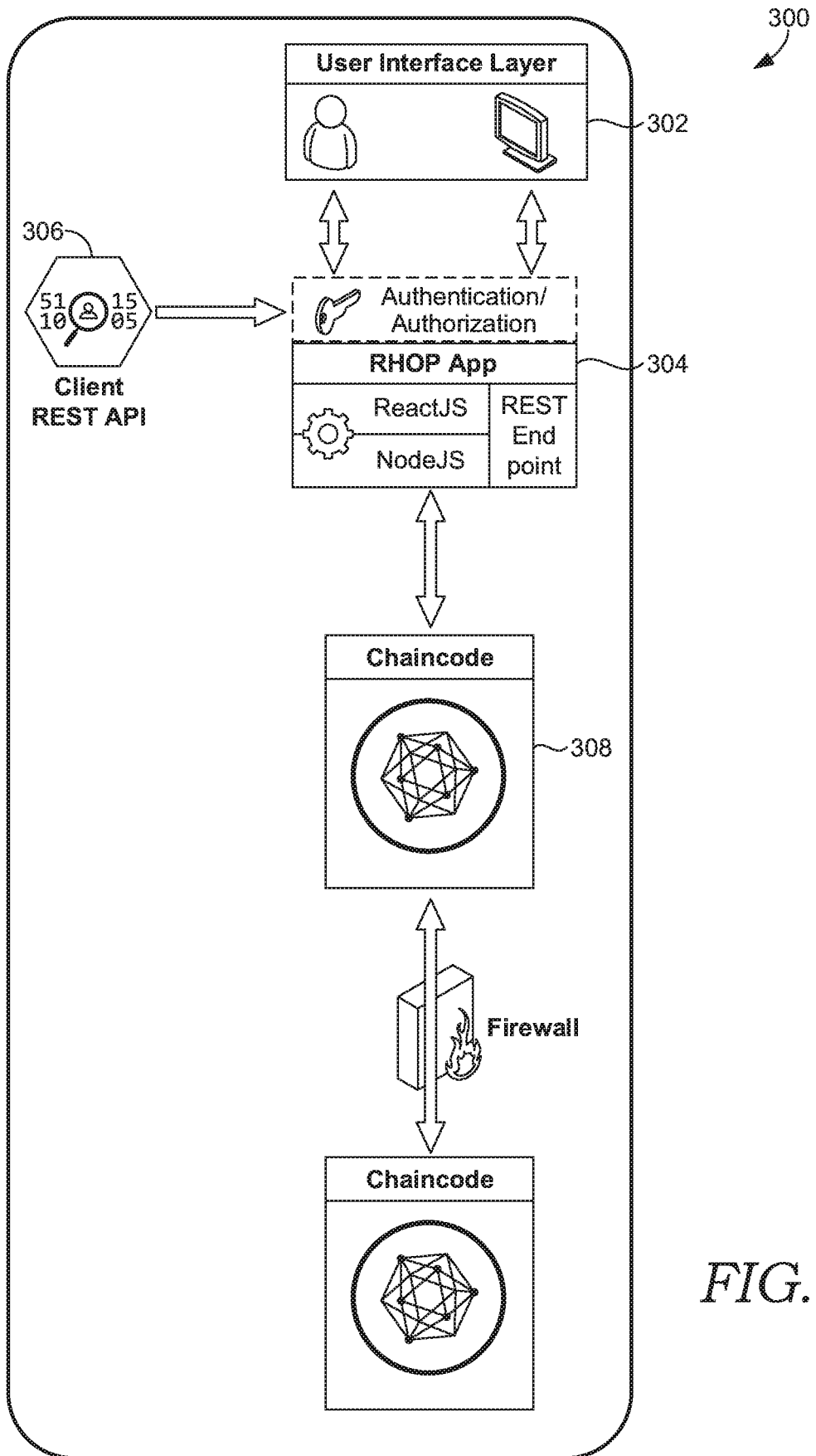
FIG. 3 depicts an exemplary flow of communication between the various components of a rapid hyperledger onboarding platform, in accordance with embodiments of the present disclosure.

In practice, and referring now to FIG. 3, an exemplary flow of communication between the various components is provided illustrating a method of utilizing the rapid hyperledger onboarding platform, in accordance with an embodiment of the present invention. The method may be performed by any computing device (such as computing device described with respect to FIG. 1) with access to a rapid hyperledger onboarding platform (such as the one described with respect to FIG. 2) or by one or more components of the rapid hyperledger onboarding platform.

Initially, at the user interface layer 302, a user that is not directly interacting with the REST endpoints of the rapid hyperledger onboarding platform (i.e., via the client application 306) can register with credentials, fields (for which data should be inserted) and the context. The user interface layer 302 can also be leveraged for searching based on the fields or hash key. A user can use the user interface layer 302 to create a blockchain network and private channel or to view data that is recorded in the blockchain.

To register a blockchain in the rapid hyperledger onboarding platform via the user interface layer 302 or the client application 306, a user may provide a user identification, a password, a department, and a context. Using these parameters, a new blockchain 308 and a private channel with the name of the context is generated for the particular user. Once the user clicks on register, the user is navigated to another page where the user can provide a data source (e.g., a FHIR URL or a JSON object). The fields will be accordingly filtered, and the user can select as many fields as the user wants to store in the blockchain 308. This selection of fields becomes part of the first block (i.e., the genesis block) in the blockchain 308. Once this data gets inserted, after each insertion of data, the blockchain 310 responds with the generated hash which can later be used to fetch the inserted data.

At the RHOP application 304, the user interface layer 302 or the client application 306 interacts with the REST endpoints to perform operations such as registration, insertion, and querying. The data is stored in the blockchain 308 is stored per user preference (as stored during registration in the genesis block). The blockchain 308 internally comprises of certifying authorities, membership service providers, orderers, and endorsing peers.

Figure 4:
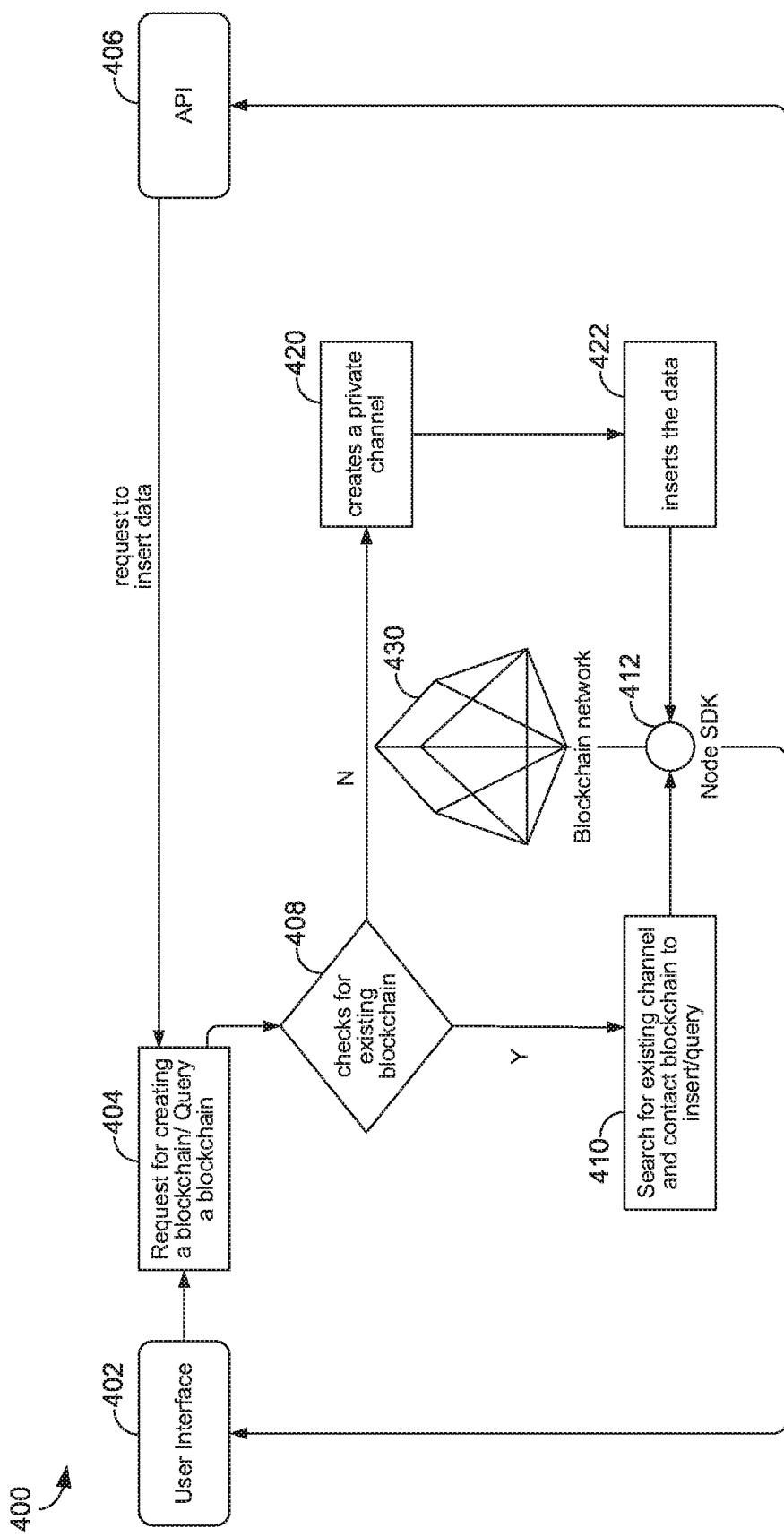
FIG. 4 is a flow diagram of a method for utilizing a rapid hyperledger onboarding platform, in accordance with embodiments of the present disclosure.

Turning now to FIG. 4, a flow diagram is provided illustrating a method 400 for utilizing a rapid hyperledger onboarding platform, in accordance with embodiments of the present invention. Method 400 may be performed by any computing device (such as computing device described with respect to FIG. 1) with access to a rapid hyperledger onboarding platform (such as the one described with respect to FIG. 2) or by one or more components of the rapid hyperledger onboarding platform.

Initially, at step 402, a user may log into the rapid hyperledger onboarding platform via a user interface. The user may request, at step 404, to create a blockchain or query an existing blockchain. Alternatively, an application, at step 406, may make a request to insert data into the blockchain. In both instances, the rapid hyperledger onboarding platform checks for an existing blockchain, at step 408.

Upon identifying an existing blockchain, the rapid hyperledger onboarding platform searches for an existing channel, at step 410. Additionally, the rapid hyperledger onboarding platform contacts the blockchain to insert or query the data. At step, 412, the data is inserted (and passed as an argument in the channel) or queried at the client node. The data is then propagated to or retrieved from the blockchain network, at step 430.

Upon determining an existing blockchain does not exist, the rapid hyperledger onboarding platform creates a private channel, at step 420. The rapid hyperledger onboarding platform inserts the data, at step 422. At step 430, the data is propagated from the client node to the blockchain network.

Data and/or queries are sent to the blockchain network via node SDK. The blockchain can respond in two ways. For an insertion, the blockchain sends back the hash that is generated on the basis of data being inserted. For a query, the blockchain sends back the block of data as a response to the query.

Figure 5:
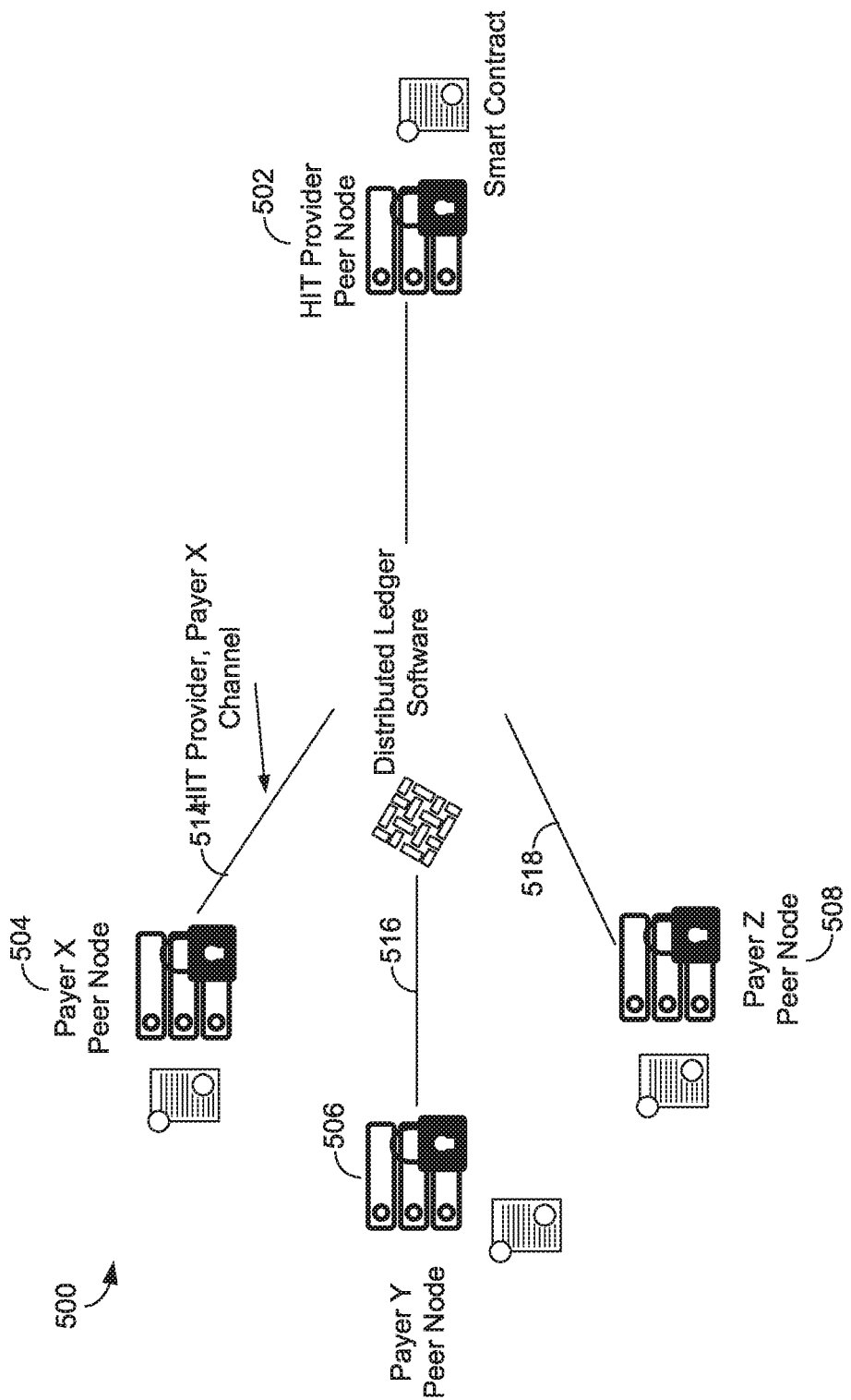
FIG. 5 depicts an exemplary framework of a provider peer node and a group of payer peer nodes utilizing a rapid hyperledger onboarding platform, in accordance with embodiments of the present disclosure.

In FIG. 5, an exemplary framework of a provider peer node 502 and a group of payer peer nodes 504, 506, 508 utilizing a rapid hyperledger onboarding platform is depicted, in accordance with embodiments of the present disclosure. As illustrated, a healthcare information technology provider may have payer contracts with multiple providers, such as payer X, payer Y, and payer Z. Utilizing the rapid hyperledger onboarding platform, the provider is able to set up private channels 514, 516, 518 for each payer to perform operations on the distributed ledger. Each channel 514, 516, 518 provides smart contract code execution for an application being utilized by the provider and payers such that blocks are replicated to a node corresponding to a particular transaction between the provider and the payer and not replicated to other payer peer nodes. For example, a transaction between the provider and Payer X is only replicated to payer X peer node 504 and provider peer node 502.

With reference to FIGS. 6-14, illustrative screen displays 600, 700, 800 . . . 1400 of embodiments of the present invention are shown. It is understood that each of the illustrative screen displays are connected logically, such that they comprise a user interface designed for utilizing a rapid hyperledger onboarding platform. The screen displays may appear in any order and with any number of screen displays, without regard to whether the screen display is described or depicted herein. The screen displays provide tools that enable utilizing a rapid hyperledger onboarding platform, in accordance with embodiments of the present invention.

Figure 6:
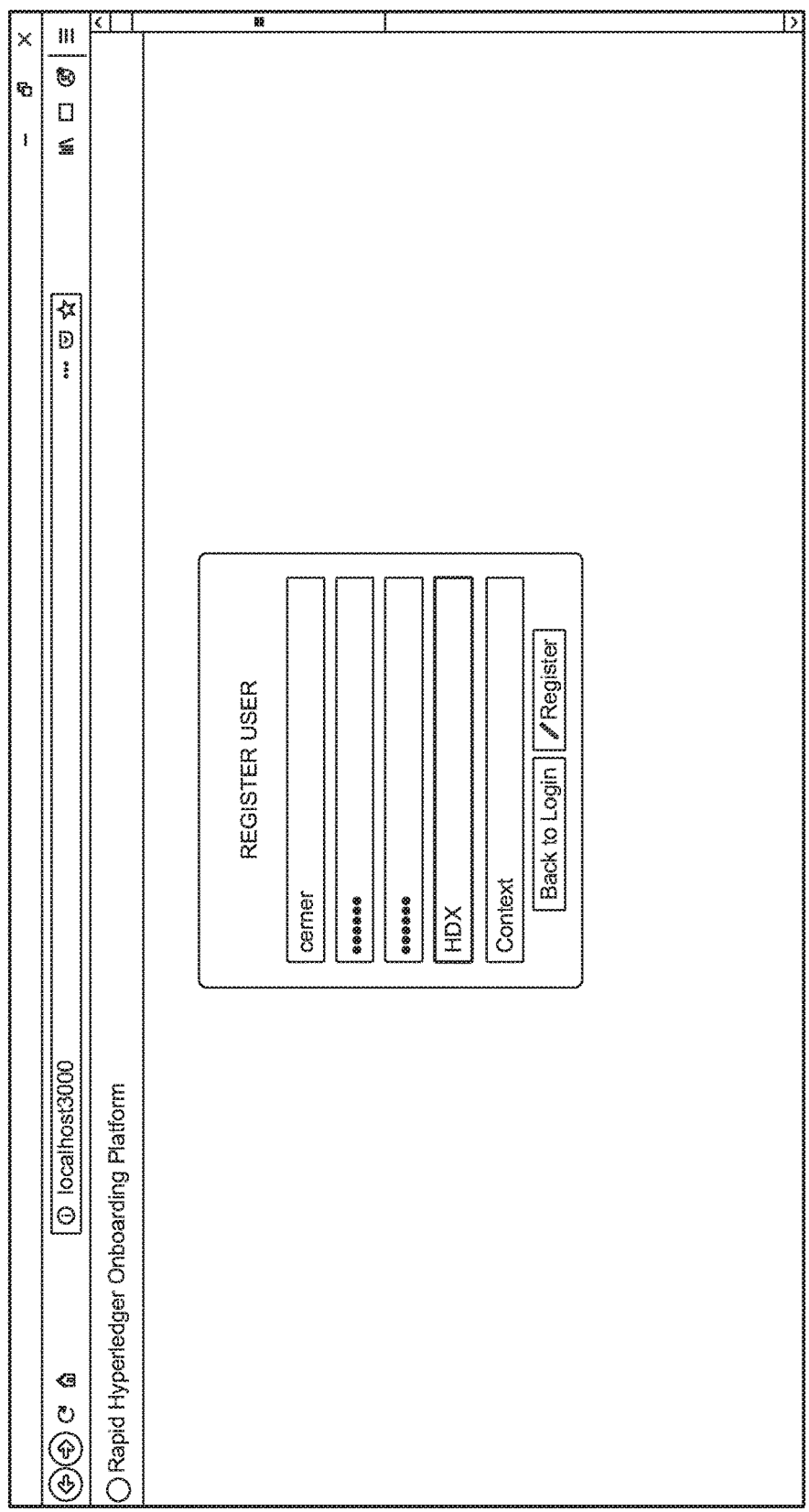
Figure 7:
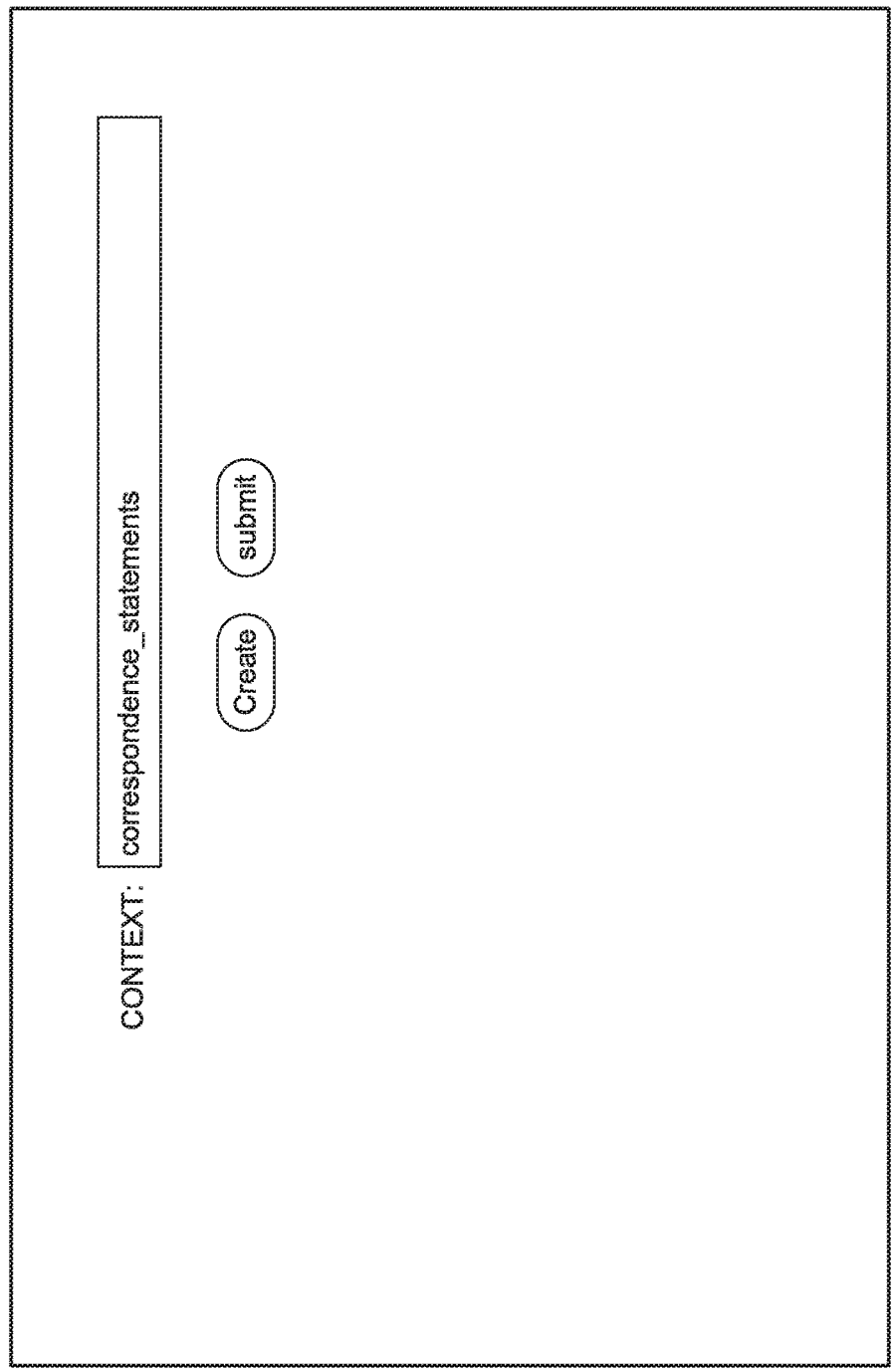

Referring initially, to FIG. 6, a registration screen 600 is initially provided. The registration screen enables a user to submit a request to create a distributed ledger or query the distributed ledger. Next, as shown in FIG. 7, a distributed ledger name screen 700 enables the user to create or submit the name of the distributed ledger being created or queried. In FIG. 8, sample JSON 800 is used as a data set to extract the fields that may be used in the future to store in the blockchain.

Figure 9:
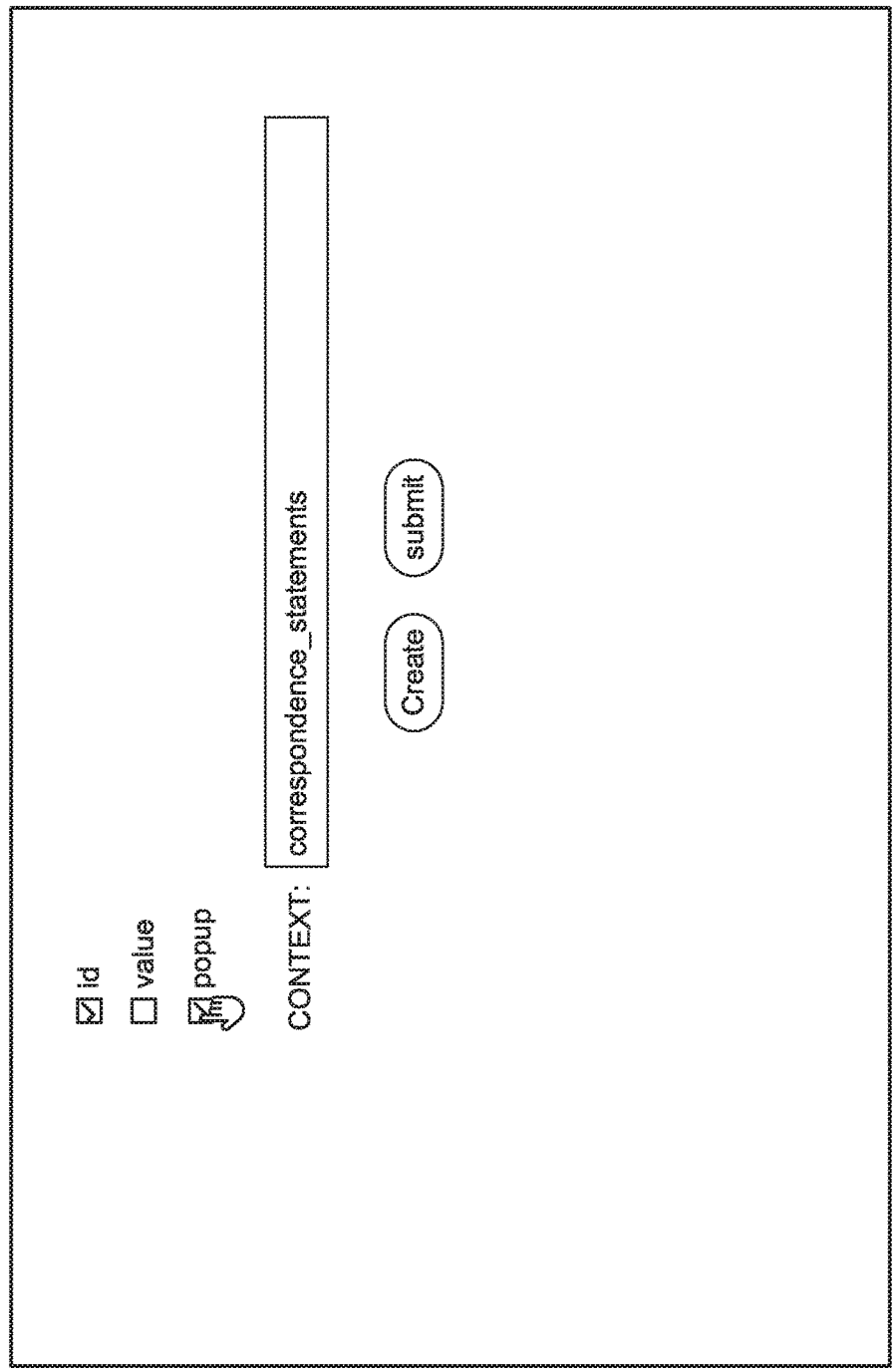

Turning now to FIG. 9, the fields 900 extracted from the sample JSON 800 in FIG. 8 are displayed to the user to enable the user to select and ensure the selected fields will be saved in the future. The selection constitutes the genesis block which gets inserted first in the blockchain corresponding to the context. The selected fields can also be inserted/queried in future interactions with the blockchain. FIG. 10 illustrates a database screen display 1000 that provides a list of the actual database that is part of the distributed ledger (e.g. Couch DB) as well as tools native to the application that has been instantiated on the distributed ledger. For example, and with reference now to FIG. 11, include screen display 1100 illustrates the JSON that constitutes the genesis block in the CouchDB with the information of the fields (e.g., id, popup) which may need to be inserted in the future. For clarity, CouchDB facilitates the query by passing the query statement itself as an argument.

Figure 12:
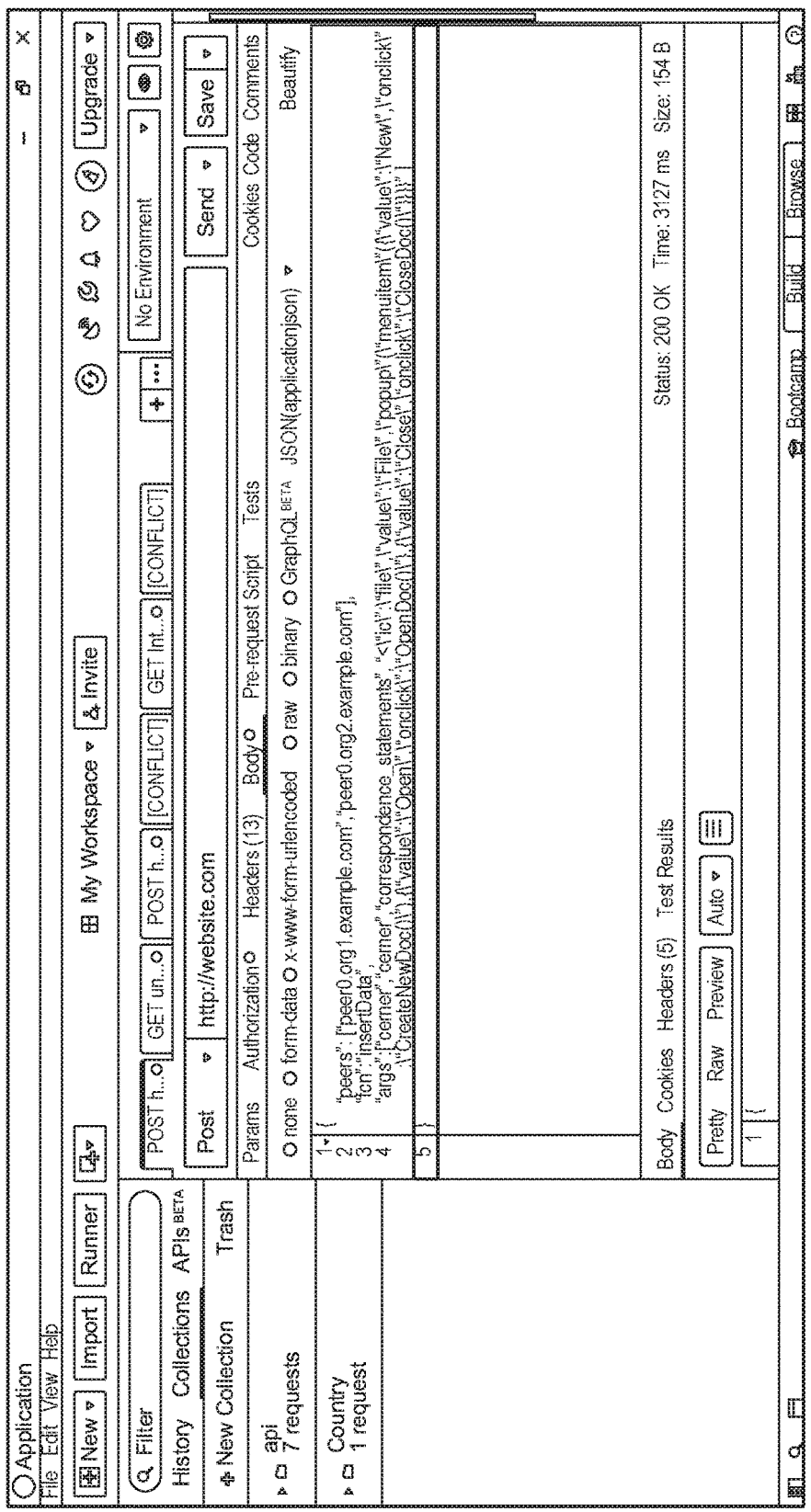
Figure 13:
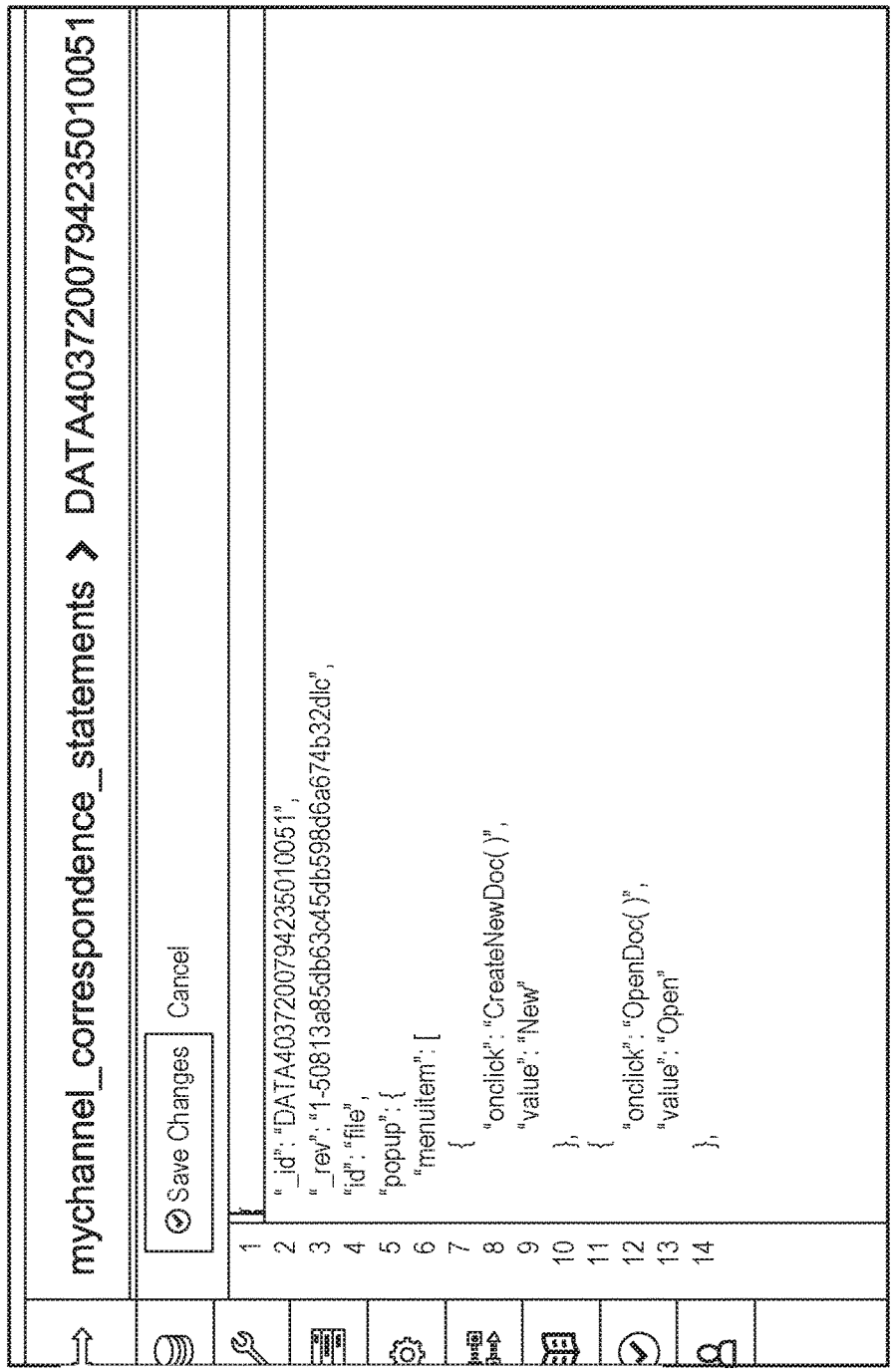
Figure 14:
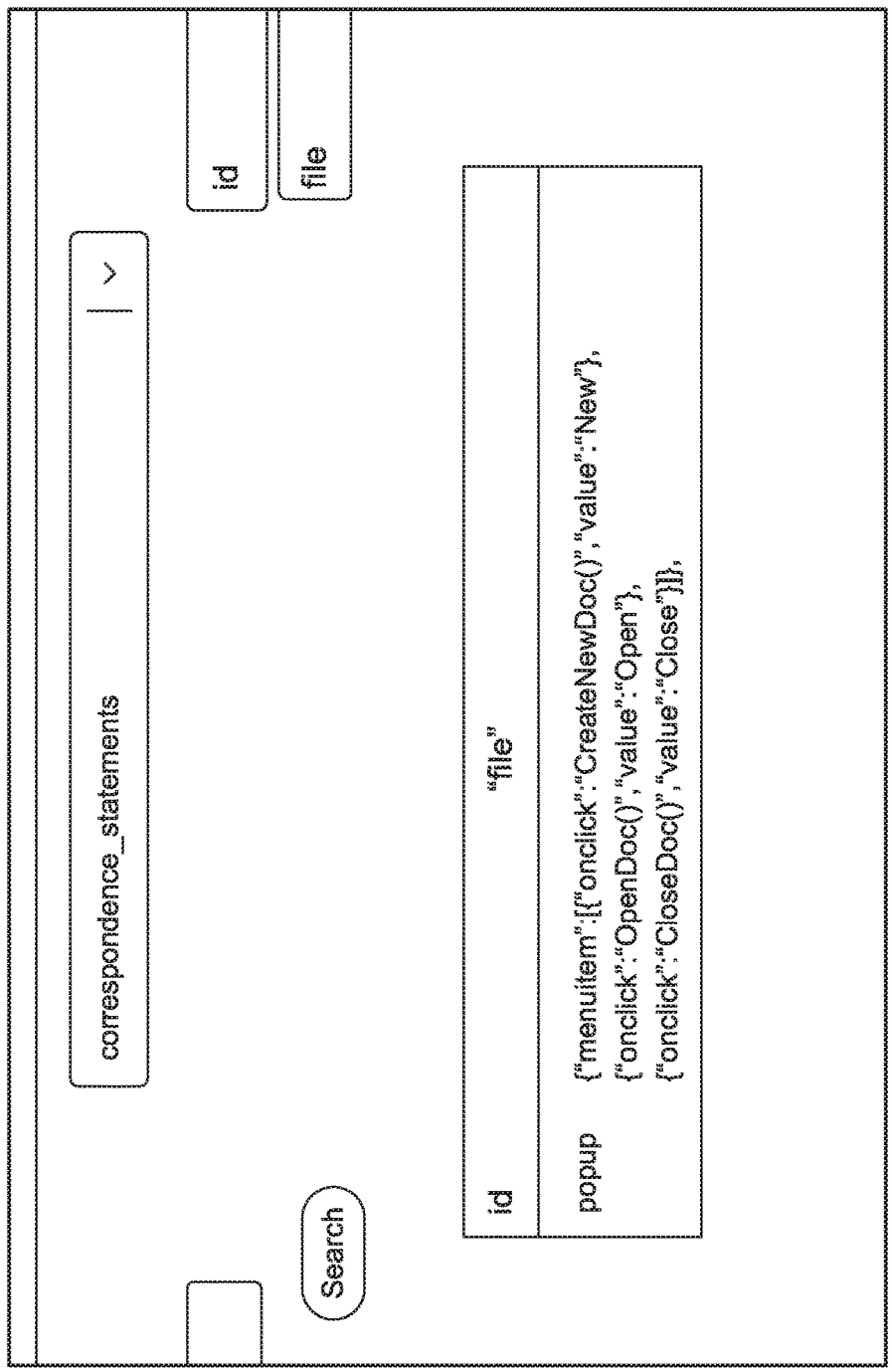

In FIG. 12, the application screen display 1200 (e.g., Postman Software) is shown to simulate the client calling the RHOP engine to insert data. From the JSON object within the args tag, the specific fields (e.g., id, popup) are chosen as per the genesis block to insert into the Blockchain. Additionally or alternatively, a user may make CRUD operation requests to the distributed ledger from within the client application. FIG. 13 provides an illustrative view 1300 of the block which got inserted in the Blockchain as per the client request. It is worthwhile to note that as per user selection in the genesis block, only the selected fields (e.g., id, popup) are stored along with other metadata associated with the block. Referring next to FIG. 14, a search screen display 1400 enables the user to search for data within the distributed ledger.

Figure 15:
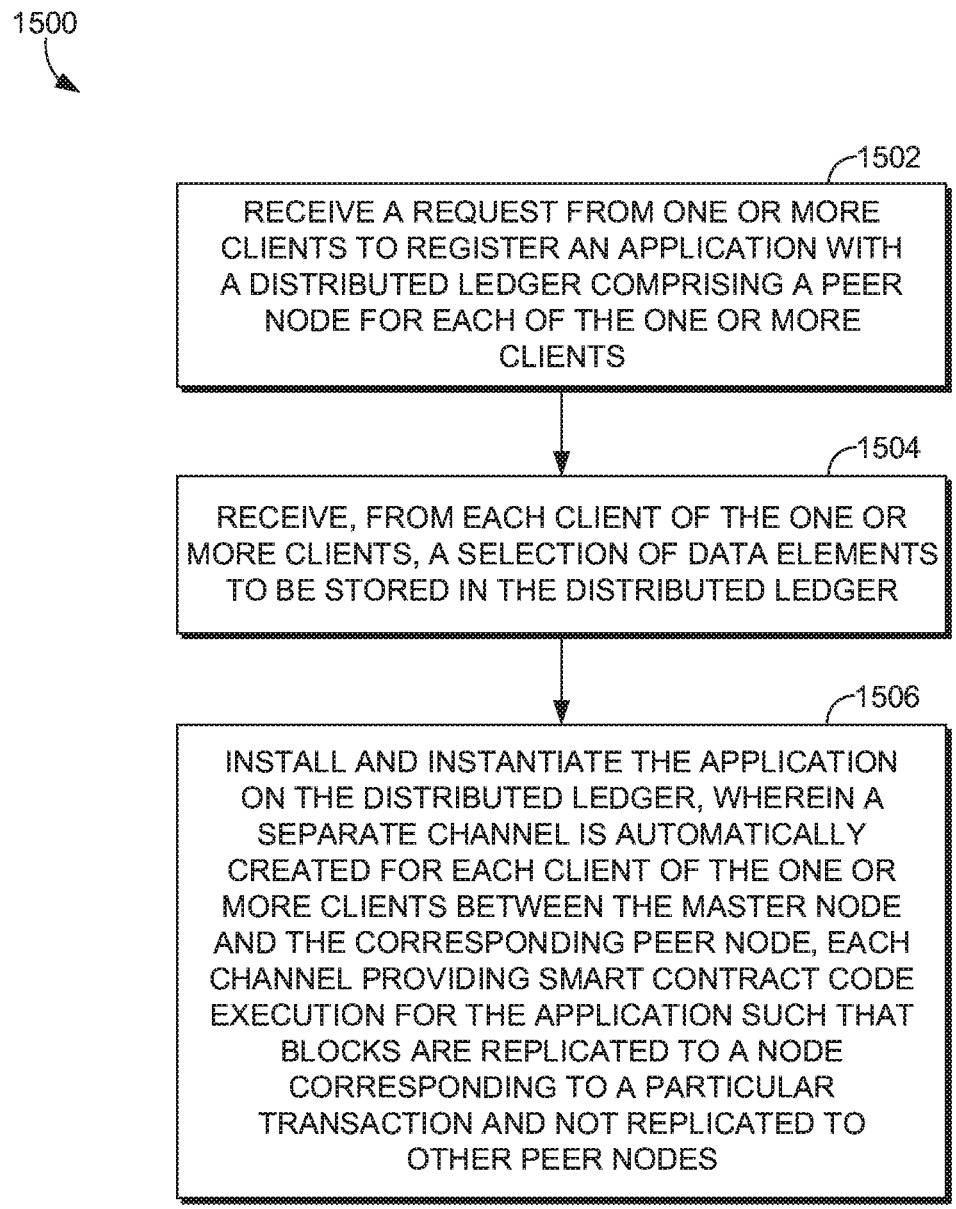
FIG. 15 is a flow diagram of a method for utilizing a rapid hyperledger onboarding platform, in accordance with embodiments of the present invention.

Turning now to FIG. 15, a flow diagram is provided illustrating a method 1500 for utilizing a rapid hyperledger onboarding platform, in accordance with embodiments of the present invention. Method 1500 may be performed by any computing device (such as computing device described with respect to FIG. 1) with access to a rapid hyperledger onboarding platform (such as the one described with respect to FIG. 2) or by one or more components of the rapid hyperledger onboarding platform.

Initially, at step 1502, a request is received from one or more clients to register an application with a distributed ledger comprising a peer node for each of the one or more clients. Additionally, a connection between the distributed ledger and other distributed ledgers may be enabled.

At step 1504, a selection of data elements to be stored in the distributed ledger is received from each client of the one or more clients.

At step 1506, the application is instantiated on the distributed ledger. A separate channel is automatically created for each client of the one or more clients between the participating peer nodes. Each channel provides smart contract code execution for the application such that blocks are replicated to a node corresponding to a particular transaction and not replicated to other peer nodes.

In embodiments, a client of the one or more clients may be enabled to interact with the distributed ledger via a REST endpoint that is exposed with a header. The header may be comprised of the context and a service account identification corresponding to the client. The client may be authenticated at the application level. Based on the authenticating, the application may be permitted or denied to perform a transaction with the distributed ledger.

In some embodiments, a user interface isolates and abstracts complexities of using REST end points to register and query the distributed ledger for each of the one or more clients. In this way, a complete abstraction of the underlying infrastructure is realized and a user or client can transition to the distribute ledger with minimal effort. Moreover, the user or client can focus on the business logic of the application and still leverage the benefits of using the distributed ledger. The user or client can access the distributed ledger for data processing (i.e., CRUD operations) using REST APIs. Additionally, a user or client can connect to multiple other distributed ledger networks using membership service providers.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Accordingly, the scope of the invention is intended to be limited only by the following claims.

What is claimed is:

1. A system for rapid distributed ledger onboarding, the system comprising:
a processor; and
a computer storage medium storing computer-usable instructions that, when used by the processor, cause the processor to:
receive a request from one or more clients to register an application of a plurality of applications with a distributed ledger for a selected concept, the distributed ledger comprising a peer node for each of the one or more clients;
receive, from each client of the one or more clients, a selection of data elements to be stored in the distributed ledger; instantiate the application on the distributed ledger for the selected concept, wherein a separate channel is automatically created for each client of the one or more clients among the corresponding peer nodes, each channel providing smart contract code execution for the application such that blocks are replicated to a node corresponding to a particular transaction for a client of the one or more clients and not replicated to other non-participating peer nodes;
receive a second request from one or clients to register a second application of the plurality of applications with a second distributed ledger for a second selected concept, the second distributed ledger comprising a second peer node for each of the one or more clients;
receive, from each client of the one or more clients, a second selection of data elements to be stored in the second distributed ledger; and
instantiate the second application on the distributed ledger for the second selected concept, wherein a second separate channel is automatically created for each client of the one or more clients among the corresponding second peer nodes, each second channel providing smart contract code execution for the second application such that blocks are replicated to a second node corresponding to a particular transaction for the client of the one or more clients and not replicated to other non-participating second peer nodes.

2. The system of claim 1, further comprising enabling a client of the one or more clients to interact with the distributed ledger via a REST endpoint, the REST endpoint exposed with a header.

3. The system of claim 2, wherein the header comprises the application context and a service account identification corresponding to the client, wherein the application context is a unique parameter that differentiates the application and the second application.

4. The system of claim 1, further comprising authenticating the client at the application level.

5. The system of claim 4, further comprising, based on the authenticating, permitting or denying the application to perform a transaction with the distributed ledger.

6. The system of claim 1, wherein a user interface isolates and abstracts complexities of implementing the distributed ledger from each of the one or more clients.

7. The system of claim 1, further comprising, enabling a connection between the distributed ledger and other distributed ledger networks.

8. A computerized method for providing rapid distributed ledger onboarding, the method comprising:
receiving a request from one or more clients to register a specific application of a plurality of applications with a distributed ledger comprising a peer node for each of the one or more clients;
receiving, from each client of the one or more clients, a selection of data elements to be stored in the distributed ledger;
instantiating the application on the distributed ledger, wherein a separate channel is automatically created for each client of the one or more clients among the corresponding peer nodes, each channel providing smart contract code execution for the application such that blocks are replicated to a node corresponding to a particular transaction and not replicated to other peer nodes;

receive a second request from one or clients to register a second application of the plurality of applications with a second distributed ledger for a second selected concept, the second distributed ledger comprising a second peer node for each of the one or more clients;

receive, from each client of the one or more clients, a second selection of data elements to be stored in the second distributed ledger; and instantiate the second application on the distributed ledger for the second selected concept, wherein a second separate channel is automatically created for each client of the one or more clients among the corresponding second peer nodes, each second channel providing smart contract code execution for the second application such that blocks are replicated to a second node corresponding to a second particular transaction and not replicated to other non-participating second peer nodes.

9. The computerized method of claim 8, further comprising enabling a client of the one or more clients to interact with the distributed ledger via a REST endpoint, the REST endpoint exposed with a header.

10. The computerized method of claim 9, wherein the header comprises the application context and a service account identification corresponding to the client.

11. The computerized method of claim 8, further comprising, based on the authenticating, permitting or denying the application to perform a transaction with the distributed ledger.

12. The computerized method of claim 8, wherein a user interface isolates and abstracts complexities of implementing the distributed ledger from each of the one or more clients.

13. The computerized method of claim 8, further comprising, enabling a connection between the distributed ledger and other distributed ledger networks.

14. One or more computer storage media having computer-executable instructions embodied thereon that, when executed by a computer, causes the computer to perform operations to provide rapid distributed ledger onboarding, the operations comprising:

receiving a request from one or more clients to register an application with a distributed ledger comprising a peer node for each of the one or more clients, the request comprises a context that identifies the application from a plurality of applications;

receiving, from each client of the one or more clients, a selection of data elements to be stored in the distributed ledger;

instantiating the application on the distributed ledger, wherein a separate channel is automatically created for each client of the one or more clients among the corresponding peer nodes, each channel providing smart contract code execution for the application such that blocks are replicated to a node corresponding to a particular transaction and not replicated to other peer nodes;

receive a second request from one or clients to register a second application of the plurality of applications with a second distributed ledger for a second selected concept, the second distributed ledger comprising a second peer node for each of the one or more clients;

receive, from each client of the one or more clients, a second selection of data elements to be stored in the second distributed ledger; and instantiate the second application on the distributed ledger for the second selected concept, wherein a second separate channel is automatically created for each client of the one or more clients among the corresponding second peer nodes, each second channel providing smart contract code execution for the second application such that blocks are replicated to a second node corresponding to a second particular transaction and not replicated to other non-participating second peer nodes.

15. The media of claim 14, further comprising enabling a client of the one or more clients to interact with the distributed ledger via a REST endpoint, the REST endpoint exposed with a header.

16. The media of claim 14, wherein the header comprises the application and a service account identification corresponding to the client.

17. The media of claim 14, further comprising authenticating the client at an application level.

18. The media of claim 14, further comprising, based on the authenticating, permitting or denying the application to perform a transaction with the distributed ledger.

19. The media of claim 14, wherein a user interface isolates and abstracts complexities of implementing the distributed ledger from each of the one or more clients.

20. The media of claim 14, further comprising, enabling a connection between the distributed ledger and other distributed ledger networks.

* * * * *